United States Patent
Zylstra et al.

[11] Patent Number: 5,957,247
[45] Date of Patent: Sep. 28, 1999

[54] ACTUATOR FOR A PARKING BRAKE

[75] Inventors: Daniel Ray Zylstra, Niles, Mich.;
Norman Lee Hostetler, Walkerton, Ind.

[73] Assignee: Robert Bosch Technology Corp, Broadview, Ill.

[21] Appl. No.: 08/989,494

[22] Filed: Dec. 12, 1997

[51] Int. Cl.⁶ ..................................................... F16D 51/00
[52] U.S. Cl. ..................... 188/78; 188/79.64; 188/250 F; 188/325; 188/336
[58] Field of Search ........................ 188/78, 72.2, 72.7, 188/72.9, 79.62, 79.64, 106 A, 106 F, 205 R, 250 A, 250 F, 325, 327, 328, 329, 330, 331, 332, 333, 334, 341, 340, 336, 339, 2 D

[56] References Cited

U.S. PATENT DOCUMENTS

| | | |
|---|---|---|
| 1,970,680 | 8/1934 | Williams . |
| 2,024,137 | 12/1935 | Adams ....................................... 188/78 |
| 2,069,344 | 2/1937 | White . |
| 3,420,340 | 1/1969 | Hopf ..................................... 188/78 X |
| 5,180,037 | 1/1993 | Evans ..................................... 188/2 D |
| 5,311,971 | 5/1994 | Courbot .................................. 188/2 D |
| 5,529,149 | 6/1996 | Johannesen et al. .................. 188/78 X |
| 5,531,298 | 7/1996 | Brooks . |

FOREIGN PATENT DOCUMENTS

| | | |
|---|---|---|
| 972 464 | 1/1976 | France . |
| 25 24 724 | 12/1976 | Germany . |
| 195 24 982 | 1/1997 | Germany . |

*Primary Examiner*—Robert J. Oberlietner
*Assistant Examiner*—Pamela J. Lipka
*Attorney, Agent, or Firm*—Leo H McCormick, Jr.; Warren Comstock

[57] ABSTRACT

A drum-in-hat brake assembly (10) having first (12) and second (14) brake shoes retained on a backing plate (16) by first (18) and second (20) pins connected to the backing plate (16). The first (12) and second (14) brake shoes are aligned on the backing plate (16) by an anchor post (40) and connected to a reverse actuator (26). The reverse actuator (26) receives an input force to respectively move first (42) and second (44) friction pads associated with the first (12) and second (14) brake shoes into engagement with a drum (46) to effect a brake application. The reverse actuator (26) includes a first lever (52) and a second lever (54), each of which have a flat plate (60,76) that extends through an opening (62) in the backing plate (16). A resilient member (90) located in the opening (62) maintains the flat plates (60,76) in a same perpendicular plane with respect to the backing plate (16). The first (52) and second (54) levers which are connected to the first (12) and second (14) brake shoes and to each other through a semi-circular indentation (70) on the first lever (52) adjacent a first end (56) which receives a semi-circular projection (82) extending from a first end (72) on the second lever (54). A spring (48,50) acting through the first (12) and second (14) brake shoes which holds the semi-circular projection (82) in the semi-circular indention (70) to separate a second end (58) on flat plate (60) from a second end (74) on flat plate (76). An actuation cable (91) connected to the second ends (58,74) provides an input force which causes one of the first (52) and second (54) levers to pivot about the semi-circular indentation (70) and move the second ends (58,74) toward each other while the first ends (56,72) correspondingly move away from each other to provide an input force to effect a brake application.

11 Claims, 3 Drawing Sheets

ACTUATOR FOR A PARKING BRAKE

This invention relates to reverse in-plane levers through which an input force is applied to move first and second friction pads associated with first and second brake shoes into engagement with a drum to effect a brake application.

BACKGROUND OF THE INVENTION

Drum-in-hat brake assemblies, such as in U.S. Pat. Nos. 5,180,037 and 5,529,149, have been utilized on rear axles brake systems of vehicles in order to provide a disc brake for service braking and a drum brake for parking. In these systems, the disc brake is a hydraulically actuated brake while the drum brake typically is a mechanically actuated brake. Various lever mechanisms can be utilized to actuate the drum brake although it is highly desirable to provide a simple but robust mechanical actuator for the drum brake. However in all such known mechanical actuators, a pin such as disclosed in U.S. Pat. No. 1,970,680, is utilized to join first and second levers into a scissors arrangement. The levers pivot about the pin to supply brake shoes with an input to effect a brake application. Unfortunately, after an extended period of use wear may occur between the pin and/or levers and as a result noise can be created when a vehicle travels over uneven terrain. Additionally, it is highly desirable that the actuator provide equal actuation forces for both directions of potential vehicle movement, forward and backward. Thus, if the vehicle is parked on a hill that tends to make the vehicle roll in either the forward or reverse direction, the same parking brake force is available for keeping the vehicle parked and preventing movement in either direction. It is desirable that the actuator not require a cast backing plate to include projections, abutment housing, and other structures which add significantly to the total weight of a drum-in-hat assembly. It is also desirable that the actuator be able to float freely between the respective ends of the drum brake shoes, while not imposing reaction forces on any housing members for the actuator but being capable to immediately supply a moving force to bring a friction pad into engagement with the brake drum to effect a brake application.

SUMMARY OF THE INVENTION

The present invention provides solutions to the known parking brake assembles for use in a drum-in-hat brake system by providing an improved in-plane reverse actuator. The drum-in-hat brake assemblies includes first and second brake shoes which are retained by first and second pins on a backing plate. The first and second brake shoes have first ends which are aligned on the backing plate by an anchor post and connected to the in-plane reverse actuator. The reverse actuator receives a mechanical input force to respectively move first and second friction pads associated with the first and second brake shoes into engagement with a drum to effect a brake application. The reverse actuator includes a first lever and a second lever, each of which have a flat plate that extends through an opening in the backing plate. A resilient member located in the opening maintains the flat plates in a same plane perpendicular with the backing plate. A slot adjacent a first end of each lever respectively receives the first ends of the first and second brake shoes while a semi-circular indentation on the first lever receives a semi-circular projection extending from the second lever. The first lever extends along an angle from the semi-circular indentation while the second lever extends along an angle from the semi-circular projection such that their second ends are separated from each other by a predetermined distance. A spring acting through the first and second brake shoes holds the semi-circular projection in the semi-circular indention and urges the first ends of the first and second levers into engagement with each other in a rest position. An actuation cable connected to the second ends provides an input force which causes the first and second levers to pivot about the semi-circular indentation and move the second ends toward each other while the first ends correspondingly move away from each other to provide an input force to effect a brake application.

An advantage of this parking brake structure in a drum-in-hat brake assembly is provided by a reverse actuator wherein first and second levers are joined together through a spring force and maintained in a same plane perpendicular to a backing plate by a resilient member.

According to this invention, a parking brake assembly includes a first lever which has a flat plate with semi-circular indentation to receive a semi-circular projection which extends from a flat plate of a second lever, the first and second flat plates being located in a same plane which is perpendicular to a backing plate by a resilient member and maintained in engagement by a spring force applied to hold first and second brake shoes in a rest position.

A further advantage of this brake system is provided by the elimination of a need for a pivot pin for joining a first lever to a second lever of an actuator for a parking brake.

DETAILED DESCRIPTION

Figure 1:
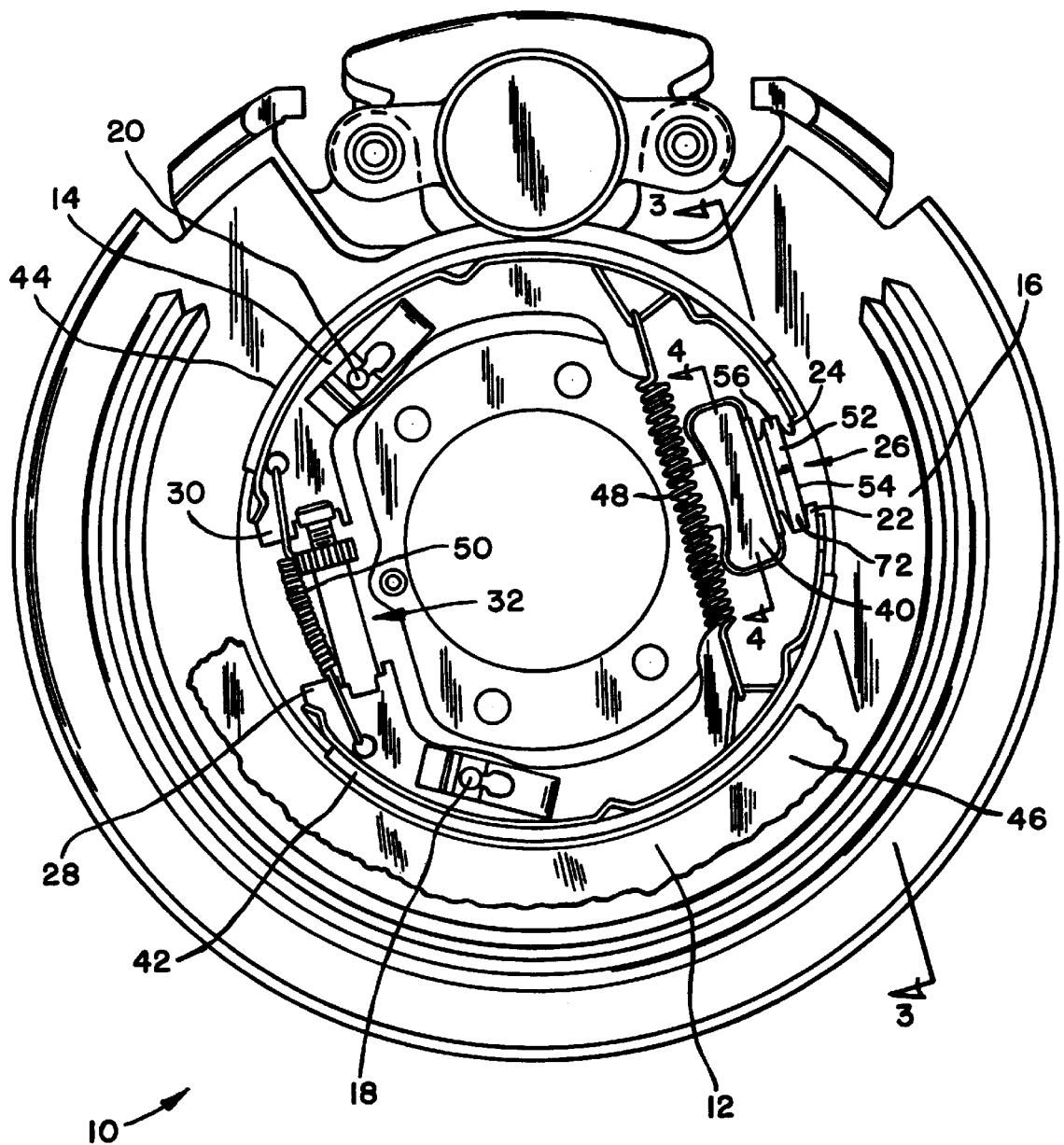
FIG. 1 is a schematic outboard illustration of a drum-in-hat brake assembly made according to the principals of the present invention.
Figure 2:
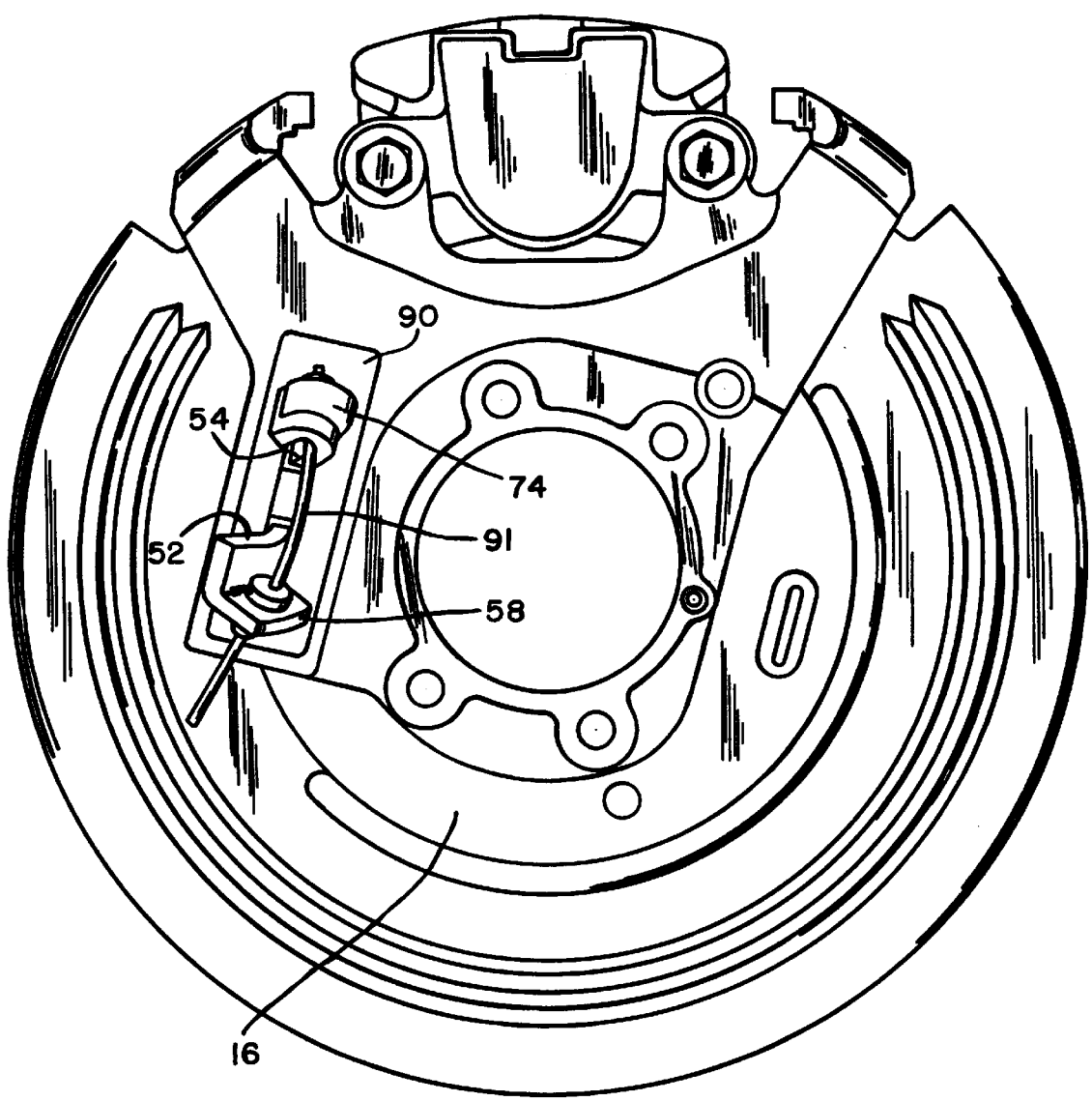
FIG. 2 is a schematic inboard illustration of a drum-in-hat brake assembly of FIG. 1.

The drum-in-hat brake assembly 10 as shown in FIGS. 1 and 2, has first 12 and second 14 brake shoes which are retained on a backing plate 16 by first 18 and second 20 pins connected to a backing plate 16. Brake shoe 12 has a first end 22 and brake shoe 14 has a first end 24, respectively, connected to a reverse actuator 26 and aligned in slots 36, 38, see FIG. 3, on an anchor post 40 attached to the backing plate 16. Further, brake shoe 12 has a second end 28 and brake shoes 14 has a second end 30, respectively, connected to an adjuster mechanism 32. The second ends 28 and 30 are selectively spaced apart by the adjuster mechanism 32, of a well known type such as illustrated in U.S. Pat. No. 5,480, 010, to maintain a predetermined running clearance between first 42 and second 44 friction pads and a drum 46, only a portion of which is illustrated. First 48 and second 50 springs are connected to the first 12 and second 14 brake shoes for urging the first ends 22,24 toward the anchor post 40 and into engagement with the reverse actuator 26 while the second ends 28,30 are urged into engagement with adjuster mechanism 32. An input force applied to the reverse actuator 26 is communicated through the first ends 22,24 for moving the first 42 and second 44 friction pads into engagement with a drum 46 to effect a brake application.

Figure 3:
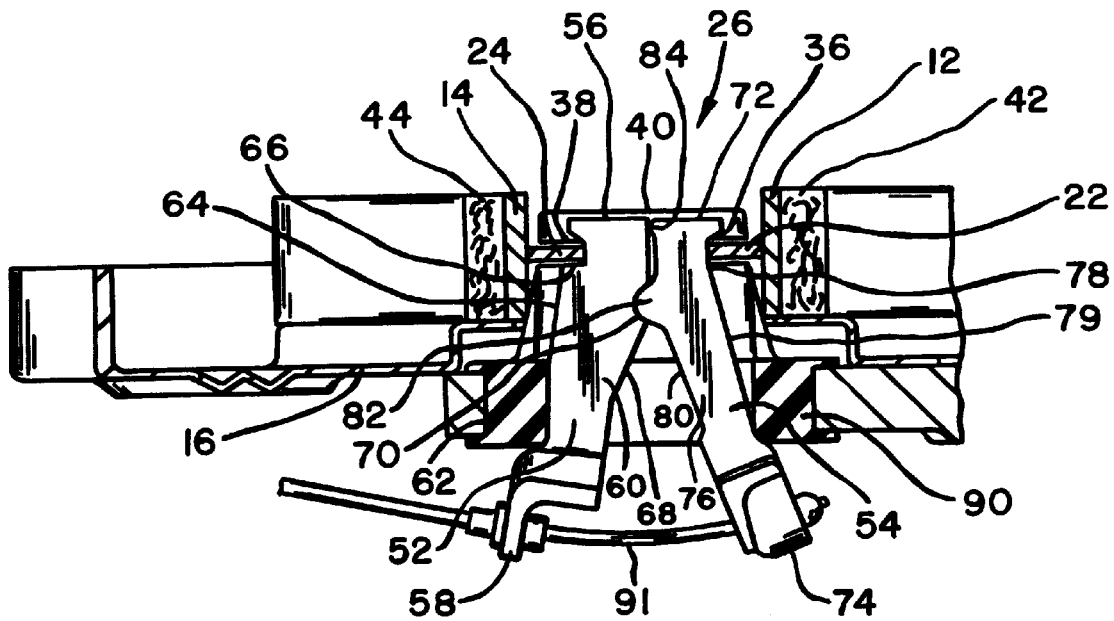
FIG. 3 is a partial sectional view taken along lines 3—3 of FIG. 1.

In more particular detail, the reverse actuator 26, as best illustrated in FIG. 3, includes a first lever 52 and a second lever 54.

The first lever 52 has a first end 56 and a second end 58 with an essentially flat plate 60 that extends through an opening 62 in backing plate 16. Flat plate 60 has a first side 64 with a slot 66 for receiving end 24 of brake shoe 14 and a second side 68 with a semi-circular indentation 70 therein. Indentation 70 has an arc of less than 180° which is located at about one-fourth the distance from the first end 56 to the second end 58. Further, the second side 68 of lever 52 extends along an angle from the semi-circular indentation 70 toward the second end 58.

The second lever 54 has a first end 72 and a second end 74 with an essentially flat plate 76 that also extends through opening 62 in backing plate 16. Flat plate 76 has a first side 79 with a slot 78 for receiving end 22 of brake shoe 12 and a second side 80 with nib 84 adjacent the first end 72 and a semi-circular projection 82 located at about one-fourth the distance from the first end 72 to the second end 74. The projection 82 has an arc of greater than 180° with the second side 80 of lever 54 extending along an angle from the semi-circular projection 82 toward the second end 74. The angles for the second sides 68 and 80 of levers 52 and 54 are such that the second ends 58 and 74 ends are separated from each other by a predetermined distance when nib 84 engages the second side 68 and semi-circular projection 82 is located in semi-circular indention 70. The location of the semi-circular indention 70 and semi-circular projection 82 define a fulcrum between the first 56,72 and second 58,74 ends for the first 52 and second 54 levers to establish a desired ratio of input force to an actuation force to effect a brake application.

A oblong rubber seal 90 located in opening 62 surrounds the flat plates 60 and 76 and holds the first 52 and second 54 levers in a plane substantially perpendicular to the backing plate 16. The seal 90 has a size such that opening 62 is sealed to prevent moisture from being communicating to the friction pads 42,44 while at the same time having sufficient rigidity to hold the flat plates 60,76 in a same plane and absorbing any noise that may be produced through vibration of the drum-in-hat brake assembly 10.

Figure 4:
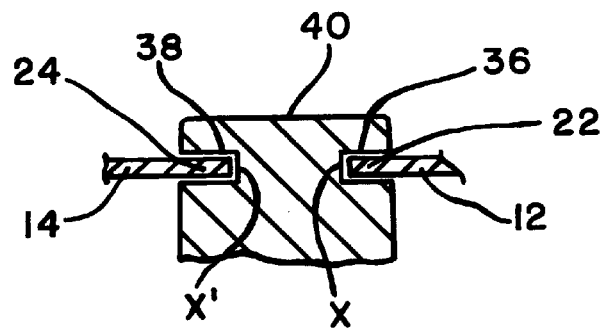
FIG. 4 is a sectional view taken along lines 4—4 of FIG. 1.

The force supplied by springs 48 and 50 is transmitted through the first ends 22,28 of brake shoes 12 and 14 to urge the first ends 56 and 72 toward each other such in a rest position, nib 84 engages the second side 68 of lever 52 adjacent end 56. The height of nib 84 is such that on engagement with the second side 68 a clearance "x,x'" is created between the first ends 22,24 of the first 12 and second 14 brake shoes and anchor post 40, see FIG. 4.

The second ends 58,74 of the first 52 and second 54 levers are connected to an actuation cable 91. The second ends 58,74 respond to an input force by pivoting about the semi-circular indentation 70 to move the second ends 58,74 toward each other while the first ends 56,72 correspondingly move away from each other to provide an input force to move ends 22,24 of the brake shoes 12 and 14 and friction pads 42,44 toward drum 46 and effect a brake application.

MODE OF OPERATION

An input force applied to ends 58 and 74 causes levers 52 and 54 to pivot as semi-circular projection 82 moves in an arc about the semi-circular indentation 70 to transmit an input force to the first ends 22,24 of brake shoes 12 and 14 and move friction pads 42,44 into engagement with drum 46. Since ends 22,24 are directly connected to ends 56,72 the input force is transmitted to effect the brake application without significant lost motion. On termination of the input force acting on ends 58,74 the force from springs 48,50 return the levers 52,54 to the rest position illustrated in FIG. 3.

We claim:

1. A drum-in-hat brake assembly (10) having first (12) and second (14) brake shoes retained on a backing plate (16) by first (18) and second (20) pins, each of said first (12) and second (14) brake shoes has a first engagement end (22,24) and a second engagement end (28,30), said first engagement end (22,24) of each of said first (12) and second (14) brake shoes being aligned on said backing plate (16) by an anchor post (40) and connected to an actuator assembly (26) for receiving an input force to respectively move first (42) and second (44) friction pads associated with said first (12) and second (14) brake shoes into engagement with a drum (46) and effect a brake application, said second engagement end (28,30) of each of said first (12) and second (14) brake shoes being selectively spaced apart by an adjuster mechanism (32) to maintain a predetermined running clearance between said first (42) and second (44) friction pads and said drum (46), spring means (48,50) for urging said first (12) and second (14) brake shoes toward said anchor post (40) and actuator assembly (26), said actuator assembly (26) being characterized by a first lever (52) and a second lever (54), said first lever (52) having a first flat plate (60) with a first side (64) and a second side (68) which extend from a first end (56) to a second end (58), said second lever (54) having a second flat plate (76) with a first side (79) and a second side (80) which extend from a first end (72) to a second end (74), said first (60) and second (75) flat plates passing through an opening (62) in said backing plate (16), said first side (64) of said first flat (60) plate having a first slot (66) located adjacent said first end (56) for respectively receiving said first engagement end (22) of said first brake shoe (12) and said first side (79) of said second flat plate (76) having a second slot (78) located adjacent said first end (72) for receiving said first engagement end (24) of said second brake shoe (14), said first flat plate (60) having a semi-circular indentation (70) on said second side (68) for receiving a semi-circular projection (82) extending from said second side (80) of said second flat plate (76), said second side (68) of said first flat plate (60) extending along an angle from said semi-circular indentation (70) to said second end (58) of said first flat plate (60) and said second side (80) of said second flat plate (76) extending along an angle from said semi-circular projection (82) to said second end (74) of said second flat plate (76) such that said second ends (58,74) are separated from each other by a predetermined distance, said resilient means (48,50) acting through said first (12) and second (14) brake shoes to hold said semi-circular projection (82) in said semi-circular indention (70) and urge said second sides of said first and second flat plates (68,80) adjacent said first ends (56,72) into engagement in a same perpendicular plane to said backing plate (16) in a rest position, said second ends (58,74) of said first (52) and second (54) levers being connected to an actuation cable (91) and responding to an input force by pivoting about said semi-circular indentation (70) to respectively move said second ends (58,74) of said first and second flat plates (60,76) toward each other while said first ends (56,72) of first and second flat plates (60,76) correspondingly move away from each other to provide said input force to effect a brake application.

2. The drum-in-hat brake assembly (10) as recited in claim 1 wherein said first end (72) of said second flat plate (76) is further characterized by a nib (84) located on the second side (80) thereof, said nib (84) having a predetermined height such that on engagement with said second side (68) of said first flat plate (60) a clearance is created between said first end (56) of said first flat Plate (60) and said first end

(72) of said second flat plate (76) and correspondingly said first (12) and second (14) brake shoes and said anchor post (40) to reduce travel required to bring the engagement of said first (42) and second (44) friction pads with said drum (46).

3. A drum-in-hat brake assembly (10) having first (12) and second (14) brake shoes retained on a backing plate (16) by first (18) and second (20) pins, each of said first (12) and second (14) brake shoes having a first engagement end (22,24) and a second engagement end (28,30), said first engagement end (22,24) being aligned on said backing plate (16) by an anchor post (40) and connected to an actuator assembly (26) for receiving an input force to respectively move first (42) and second (44) friction pads associated with said first (12) and second (14) brake shoes into engagement with a drum (46) and effect a brake application, said second engagement end (28,30) being selectively spaced apart by an adjuster mechanism (32) to maintain a predetermined running clearance between said first (42) and second (44) friction pads and said drum (46), spring means (48,50) for urging said first (12) and second (14) brake shoes toward said anchor post (40) and actuator assembly (26), said actuator assembly (26) being characterized by a first lever (52) and a second lever (54), said first lever (52) having a first flat plate (60) with a first side (64) and a second side (68) which extend from a first end (56) to a second end (58), said second lever (54) having a second flat plate (76) with a first side (79) and a second side (80) which extend from a first end (72) to a second end (74), said first (60) and second (76) flat plates passing through an opening (62) in said backing plate (16), said first side (64) of said first flat plate (60) having a first slot (66) located adjacent said first end (56) for respectively receiving said first engagement end of said first brake shoe (12) and said first side (79) of said second flat plate (76) having a second slot (78) located adjacent said first end (72) of said second flat plate (76) for respectively receiving said first engagement end (24) of said second brake shoe (14), said first flat plate (60) having a semi-circular indentation (70) on said second side (68) for receiving a semi-circular projection (82) extending from said second side (80) of said second flat plate (76), said second side (68) of said first flat plate (60) extending along an angle from said semi-circular indentation (70) to said second end (58) of said first flat plate (60) and said second side (80) of said second flat plate (76) extending along an angle from said semi-circular projection (82) to said second end (74) of said second flat plate (76) such that said second ends (58,74) are separated from each other by a predetermined distance, said second side (80) of said second flat plate (76) having a nib (84) located adjacent said first end (72), said resilient means (48,50) acting through said first (12) and second (14) brake shoes to hold said semi-circular projection (82) in said semi-circular indention (70) and urge said nib (84) into engagement with said second side (68) of said first flat plate (60) in a rest position, said first (60) and second (76) flat plates being aligned in a same perpendicular plane with respect to said backing plate, said second end (58,74) of said first (52) and second (54) levers being connected to an actuation cable (91) and responding to an input force by pivoting about said semi-circular indentation (70) to respectively move said second ends of said first and second flat plates (58,74) toward each other while said first ends (56,72) of first (60) and second (76) flat plates correspondingly move away from each other to provide said input force to effect a brake application.

4. The drum-in-hat brake assembly (10) as recited in claim 3 wherein said nib (84) has a predetermined height such that on engagement with said second side (68) of said first flat plate (60) a clearance is created between said first end (56) said first flat plate (60) and said first end (72) of said second flat plate (76) and a correspondingly clearance is created between said first (12) and second (14) brake shoes and said anchor post (40) to reduce travel required to bring the engagement of said first (42) and second (44) friction pads with said drum (46).

5. A drum-in-hat brake assembly having first and second brake shoes retained on a backing plate by first and second pins, each of said first and second brake shoes has a first retaining end and a second retaining end, said first retaining end of said first and second brake shoes being aligned on said backing plate by an anchor post and connected to an actuator assembly for receiving an input force to respectively move first and second friction pads associated with said first and second brake shoes into engagement with a drum and effect a brake application, said second retaining end of said first and second brake shoes being selectively spaced apart by an adjuster mechanism to maintain a predetermined running clearance between said first and second friction pads and said drum, spring means for urging said first and second brake shoes toward said anchor post and actuator assembly, said actuator assembly being characterized by a first lever and a second lever, said first lever having a first flat plate and said second lever having a second flat plate, said first flat plate having a first side and a second side which extends from a first end to a second end, said second flat plate having with a first side and a second side which extends from a first end to a second end, said first and second flat plates extending through an opening in said backing plate and being located in a same perpendicular plane with respect to said backing plate, said first side of said first flat plate having a first slot adjacent said first end thereof for receiving said first retaining end of said first brake shoe, said first side of said second flat plate having a first slot adjacent said first end thereof for receiving said first retaining end of said second brake shoe, said first flat plate having a semi-circular indentation on said second side for receiving a semi-circular projection extending from said second side of said second flat plate, said first and second flat plates respectively extending along an angle from said semi-circular indentation and semi-circular projection such that said second ends thereof are separated from each other by a predetermined distance, said resilient means acting through said first and second brake shoes to hold said semi-circular projection in said semi-circular indention and urge said second sides of said first and second flat plates adjacent said first ends thereof into engagement along a same plane perpendicular to said backing plate while in a rest position, said second end of each of said first and second levers being connected to an actuation cable, said second end of said second lever responding to an input force by pivoting about said semi-circular indentation to move said second end of said first and second flat plates toward each other while said first ends thereof correspondingly move away from each other to provide said input force to effect a brake application.

6. The drum-in-hat brake assembly as recited in claim 5 wherein said first end of said second flat plate is further characterized by a nib on said second side thereof, said nib having a predetermined height such that on engagement with said second side of said first flat plate a clearance is created between said second side on said first flat plate and said second side on said second flat plate to create a corresponding clearance between said first and second brake shoes and said anchor post to reduce travel required to bring the engagement of said first and second friction pads with said drum.

7. The In a drum-in-hat brake assembly as recited in claim 6 wherein actuator assembly is further characterized by a resilient member located in said opening of said backing plate, said resilient member engaging first and second levers to retain said first and second flat plates in said perpendicular plane.

8. The drum-in-hat brake assembly as recited in claim 7 wherein said resilient member is further characterized by attenuating noise that may result from movement of said first and second levers.

9. The drum-in-hat brake assembly as recited in claim 8 wherein said resilient member is further characterized by sealing said opening to reduce the communication of moisture to said first and second friction pads.

10. The drum-in-hat brake assembly as recited in claim 9 wherein said semi-circular indention and semi-circular projection are characterized by defining a fulcrum between said first and second ends of said first and second flat plates.

11. The drum-in-hat brake assembly as recited in claim 10 wherein said semi-circular indention is characterized by having an arc of less than 180° and said semi-circular projection is characterized by having an arc of more than 180°.

* * * * *